United States Patent [19]

Leeson et al.

[11] 3,785,873

[45] Jan. 15, 1974

[54] ACTIVATED BATTERY

[75] Inventors: Jeffrey S. Leeson; Robert P. Laczko, both of Cuyahoga, Ohio

[73] Assignee: ESB Incorporated, Philadelphia, Pa.

[22] Filed: July 3, 1972

[21] Appl. No.: 268,877

[52] U.S. Cl. .................................. 136/114, 136/90
[51] Int. Cl. .......................................... H01m 21/00
[58] Field of Search ...................................
136/112–114, 90, 162, 166

[56] References Cited
UNITED STATES PATENTS

| | | | |
|---|---|---|---|
| 3,445,295 | 5/1969 | Smith et al............................ | 136/90 |
| 3,483,041 | 12/1969 | Kalen................................. | 136/162 |
| 3,484,297 | 12/1969 | Zaleski............................... | 136/114 |
| 3,663,302 | 5/1972 | Kaye.................................. | 136/114 |
| 2,773,927 | 12/1956 | Yeoman............................... | 136/166 |
| 2,852,592 | 9/1958 | Salauze............................... | 136/90 |

*Primary Examiner*—Anthony Skapars
*Attorney*—Robert H. Robinson et al.

[57] ABSTRACT

A storage battery cell having a dry element includes a reservoir containing an electrolyte precursor therewith. To activate the cell, it is filled with water after which the reservoir is punctured by the use of a specialized tool. The tool is forced through an opening in the battery cover puncturing first the top wall and then the bottom wall of the reservoir. In this position, the tool is locked in place against subsequent removal.

13 Claims, 4 Drawing Figures

PATENTED JAN 15 1974

3,785,873

ACTIVATED BATTERY

BACKGROUND OF THE INVENTION

1. Field of the Invention

This invention relates to storage batteries. In particular, it relates to means for feeding electrolyte to an unactivated battery.

2. Description of the Prior Art

It is a well understood fact that advantages are gained by the purchaser of a storage battery which has been filled with acid for only a short time. At the present time, a large majority of replacement batteries are given their first fill of acid at the time of purchase. Unfortunately, this requires that the battery dealer must take the responsibility of handling the acid electrolyte required for filling the battery. The electrolyte, a 25 percent solution of sulfuric acid, is a harmful and a potentially dangerous material. It should not be handled by a person unacquainted with its characteristics.

In order to reduce the hazards of the filling operation, the battery industry has in recent times explored means to activate batteries whereby it is not necessary to add sulfuric acid to the battery at the time of activation. One way that has been proposed is to locate materials within the battery which when wet with water generate the required acid. Such materials have become known as electrolyte precursors. The most desirable precursor from an electrochemical standpoint is concentrated sulfuric acid. The concentrated acid is contained in one or more reservoirs, located in each cell of the battery. Preferably the cells of the battery are first filled with water and then the reservoirs are opened allowing the concentrated acid to mingle with the water and form the electrolyte. Unfortunately, concentrated sulfuric acid is a far more hazardous material to handle than electrolyte. There is a strong possibility that some of this material will splash out of the battery at the time the reservoir is opened or that some of it may cling to the tool used in the opening operation. The present invention is directed to a means for opening the electrolyte precursor reservoir without exposing the operator to the hazard of contact with the possibly harmful material.

SUMMARY OF THE INVENTION

A reservoir located within a storage battery cell contains a liquid electrolyte precursor. An opening in the cell cover provides access to the reservoir. A puncturing means is provided which can be pushed via the opening through top and bottom walls of the reservoir allowing the liquid within to drain into the battery cell. When the puncturing means is pushed through both walls of the reservoir, a locking means operates to prevent its subsequent removal. Weakened areas may be provided in the reservoir walls to ease the puncturing operation. The puncturing means is preferably a close fit in the opening in the cell cover. Means closing the opening in the cell cover prior to use may be provided.

From this summary, it is seen that the electrolyte storage system and opening device therefore is free from the weaknesses found in systems used heretofore. First, because the puncturing means is a tight fit in the cover opening, there is no possibility of the electrolyte precursor to splash out or otherwise escape, second because the puncturing tool is firmly locked in place after use there is no possibility for it to spread strong sulfuric acid or the equivalent about a work place. Third, because the length of the tool is carefully controlled it cannot be pushed into the battery element so as to harm the same. Combined with this are the already known features of a water activated storage battery system, namely that the unactivated battery may be stored for an indefinitely long time in a dry charged condition ready for instant use, that in activating the battery it is only necessary to fill the cells with water and then push the puncturing tools in place, that there is no need to handle, measure or pour sulfuric acid electrolyte and that each cell of a battery will receive the correct amount of electrolyte of the correct strength.

DESCRIPTION OF THE PREFERRED EMBODIMENT

Figure 1:
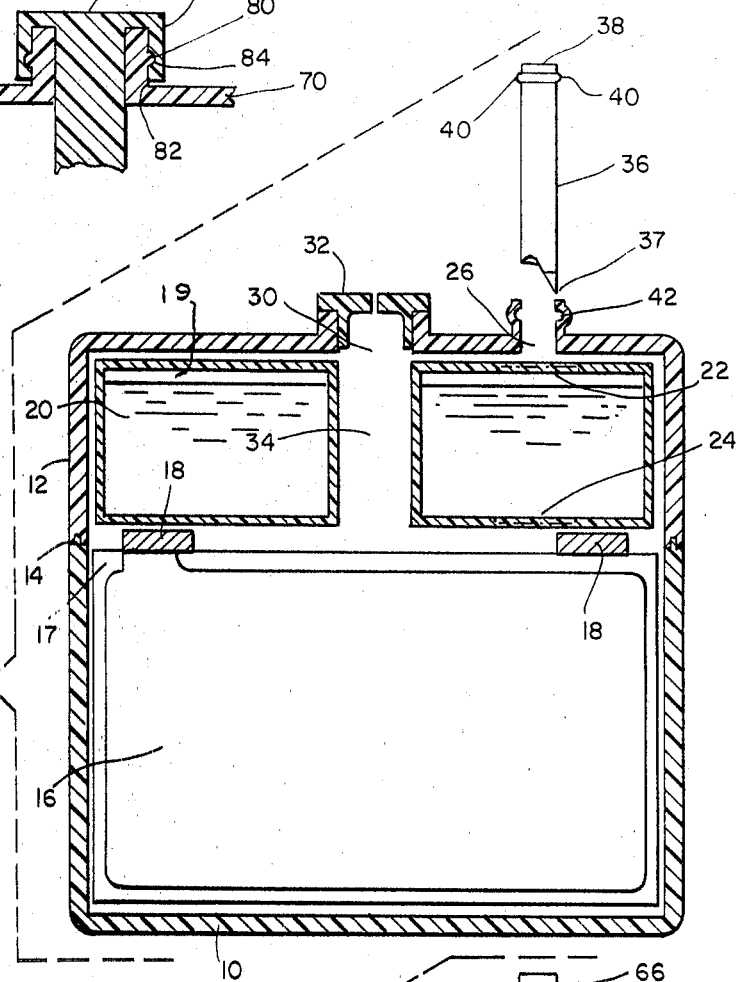
FIG. 1 depicts in cross section a first embodiment of the invention.

In FIG. 1, 10 represents a cross section of one cell of a multi cell molded plastic battery case. 12 is a cover, sealed to the case by joint 14. A battery element 16 comprised of positive plates, negative plates and separators 17 occupies the greater part of the battery compartment. Straps 18 connect positive plates and negative plates and form electrical connections to them. It is usual practice to have the battery plates dry and charged. The volume above the element and below the cover is taken up with a reservoir 20. If the reservoir is sufficiently large, it could contain the entire quantity of electrolyte needed for the cell. However, this would take nearly as much space as the battery element itself. Therefore, it has become the practice to fill the reservoir with concentrated acid or other electrolyte precursor and in this way reduce the dead space needed for electrolyte storage. Experience has shown that sulfuric acid of about 69 percent concentration (1.600 specific gravity) is a desirable electrolyte precursor.

Reservoir 20 is a thin plastic piece such as a blow molded or vacuum formed vessel. It can be made from any of the usual plastic materials which are resistant to sulfuric acid. Polyethylene or polypropylene are suitable materials. Area 22, and area 24 as shown in dashed lines in the top and bottom walls respectively of the reservoir may be thinner and hence more readily punctured than the rest of the walls of the container, however, as shown by the solid lines they may be the same thickness. The area 22 is perpendicularly over area 24 and both are directly under an access opening 26 formed in the cover 12 of the battery. The reservoir sits on the top of the battery straps 18 or on top of the separators 17. A vent opening 30 is located near the center of the cell cover 12. A vent plug 32 is located in the vent opening. For battery maintenance purposes, it is desirable to have direct access to the battery electrolyte.

In the electrolyte reservoir shown in FIG. 1, a vent passageway 34 from top to bottom is formed through the reservoir to provide the desired access or other access means may be provided.

A puncturing means 36 is provided for each cell of the storage battery. A first end of the means has a sharp cutting edge 37. The second end 38 is blunt so as to provide a comfortable area for applying pressure to the tool.

The procedure used in activating the battery shown in FIG. 1 is as follows:

First the vent-plug 32 is removed and the cell is filled with water up to a suitable level. Then the puncturing means 36 is fitted into the access opening 26 and forced by thumb pressure or other means through the first thin area 22 and then the second thin area 24. This immediately allows the electrolyte precursor located within the reservoir 20 to run out and mix with the water in the cell. Because the precursor is of greater density than water, it tends to sink to the bottom of the jar. However, in so doing it mixes to a degree with the water and eventually becomes a homogeneous mixture of electrolyte.

As shown in FIG. 1, when the puncturing means 36 is pressed home so that it will penetrate the area 24, a groove 42 formed in the lip of the access opening 26 snaps around one or more protuburances 40 formed on the puncturing means 36 and prevents the later removal of the puncturing means. It will be seen that by dimensioning the opening and the puncturing means so as to provide a close fit of the means 36 in the opening 26, the opening will direct the tool accurately at the weakened sections 22 and 24. The close fit also will prevent the escape of any acid by splash or spray outside of the battery case.

Figure 2:
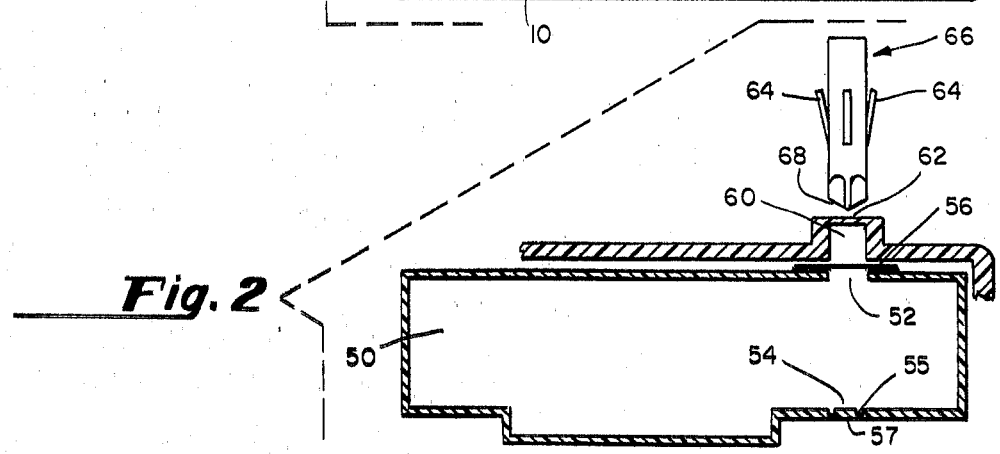
FIG. 2 depicts also in cross section a second embodiment.

A second embodiment of the invention is shown in FIG. 2. In FIG. 2, reservoir 50 has a hole 52 formed therein. The hole 52 is covered by a tape or membrane 56, fastened by heat sealing or adhesive means to the top and bottom of the reservoir. At 54 a further embodiment of the weakened area in the cell reservoir wall is shown. In the case of area 54, a circular groove 55 is formed in the wall to provide a knock-out portion 57, easily removed by pressure from the puncturing means 66.

As shown in FIG. 2, the access opening 60 is shown formed with a web 62 molded across to provide a seal for the battery during the storage period. A locking device comprising several spring fingers 64 form a part of the puncturing means 66. These fingers are resiliant and snap out after passage through the access opening 60 to effectively lock the tool 66 against removal. Also, in the embodiment of FIG. 2 the puncturing means 66 is shown with a cruciform cutting edge 68.

Figure 3:
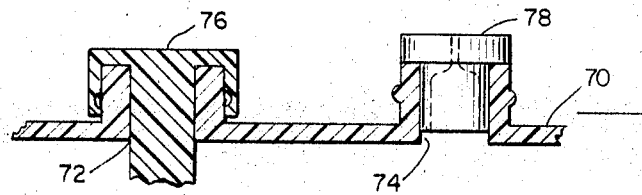
FIGS. 3 and 4 depict a further embodiment.
Figure 4:
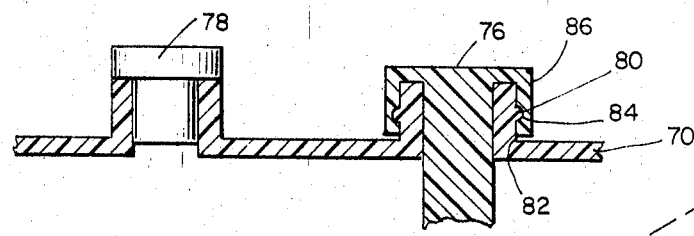

It may be desirable to use the vent well 34 for storage of the puncturing means 36 prior to the time it is needed for opening the reservoir. FIG. 3 shows a portion of a cell cover 70 having a vent opening 72 and an access opening 74. A puncturing means 76 is stored in the vent opening 72 and a vent plug 78 is located in the access opening 74. In FIG. 4, the position of the plug 78 and puncturing means 76 are reversed and are in the locations they will occupy during the active life of the battery. In the drawing shown, a locking means comprising a ring 80 formed around the access opening neck 83 and groove 84 formed in a shirt 86 forming part of the blunt end of puncturing means 76 serves to lock the puncturing means in place.

It has been found that if the reservoir 20 is substantially filled with electrolyte precursor, a considerable pressure can be built up within the reservoir when the puncturing tool is forced therein. Because of this pressure, electrolyte may be forced out of the access opening in spite of it being a close fit with the puncturing means. The build-up of pressure can be largely eliminated by providing an air space 19 within the reservoir, i.e., by not filling the reservoir completely full.

It should further be pointed out that although the puncturing means shown in FIGS. 1 to 4 suggest that they are round in section, it is not necessary that they be so shaped. Other cross sectional shape may be used to advantage such as a square section, a lunar section, etc., it only being necessary that the access opening be shaped to a snug fit around the puncturing means.

Other embodiments of the invention will be apparent from a study of the examples given. Having described our invention and given examples of its embodiment, we now claim:

1. In a storage battery comprising a container and a cover delineating a cell compartment and a cell element in the compartment the improvement which comprises:

a. a reservoir puncturing means having a first sharp puncturing end and a second blunt end;
b. a sealed reservoir having top and bottom walls located within the cell compartment above the cell element and below the cover, the reservoir having an electrolyte precursor therein, at least a portion of the reservoir having a height less than the length of the puncturing means;
c. the cover having an access opening therethrough, the access opening being located over that portion of the reservoir having a height less than the length of the puncturing means the cover including a lip surrounding the access opening; and,
d. cooperative locking means for preventing the removal of the puncturing means, a first portion of the locking means being a part of the puncturing means and a second portion of the locking means being a part of the cover; the arrangement being such that when the puncturing means is entered into the access opening and pushed therethrough to effect the engagement of the cooperative locking means so as to prevent the subsequent removal of the puncturing means from the access opening, the first sharp puncturing end of the puncturing means passes through the top and bottom walls of the reservoir thereby releasing the electrolyte precursor from the reservoir and permitting it to flow into surrounding relationship with the cell element.

2. A storage battery as defined in claim 1 wherein at least one of the walls of the reservoir located under the access opening has an area that is constructed and arranged to be more readily punctured than other portions of the walls of the reservoir.

3. A storage battery as defined in claim 2 wherein the puncturing means is dimensioned to provide a close fit in the access opening, whereby when the puncturing means is entered into the access opening and pushed therethrough, the puncturing means is directed so as to puncture the wall of the reservoir within the more readily punctured area.

4. A storage battery as defined in claim 2 wherein the more readily punctured area in the wall of the reservoir comprises an area thinner than other portions of the walls of the reservoir.

5. A storage battery as defined in claim 2 wherein the more readily punctured area in the wall of the reservoir comprise membrane means covering an opening formed in the reservoir wall, the membrane means being adhered to the reservoir wall.

6. A storage battery as defined in claim 1 wherein the first portion of the cooperative locking means comprises a stiff portion formed as a part of the puncturing means and the second portion comprises a flexible portion formed as a part of the access opening.

7. A storage battery as defined in claim 6 wherein the first portion of the cooperative locking means comprises protuberances formed on the puncturing means and the second portion comprises a groove formed in the lip of the access opening.

8. A storage battery as defined in claim 1 wherein the first portion of the cooperative locking means comprises a flexible portion formed as a part of the puncturing means and the second portion comprises a stiff portion formed as a part of the access opening.

9. A storage battery as defined in claim 8 wherein the first portion of the cooperative locking means comprises a flexible portion formed as a part of the puncturing means and the second portion comprises the underside of the storage battery cover.

10. A storage battery as defined in claim 8 wherein the first portion of the cooperative locking means comprises at least one spring finger formed as a part of the puncturing means.

11. A storage battery as defined in claim 1 including means closing the access opening prior to the insertion of the puncturing means therein.

12. A storage battery as defined in claim 11 wherein the means closing the access opening comprises a web of material integrally formed with the cover.

13. A storage battery as defined in claim 1 wherein the cover includes a vent opening therethrough, the storage battery also including a vent plug for closing the vent opening, the storage battery further including a vent passage traversing the reservoir and located beneath the vent opening included in the cover, the puncturing means being dimensioned so as to be storable within the vent opening and the vent passage, and the vent plug being dimensioned so as to be storable in the access opening.

* * * * *